United States Patent
Nagel et al.

(10) Patent No.: US 12,172,578 B2
(45) Date of Patent: Dec. 24, 2024

(54) TOO STEEP TO PARK WARNING SYSTEM AND METHOD FOR A MACHINE

(71) Applicant: Caterpillar Paving Products Inc., Brooklyn Park, MN (US)

(72) Inventors: Brian D. Nagel, Ramsey, MN (US); John L. Marsolek, Watertown, MN (US); Nicholas A. Greene, Elk River, MN (US); Caleb L. Anderson, Germantown Hills, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 86 days.

(21) Appl. No.: 17/855,042

(22) Filed: Jun. 30, 2022

(65) Prior Publication Data
US 2024/0001845 A1    Jan. 4, 2024

(51) Int. Cl.
*B60T 17/22*  (2006.01)
*B60Q 9/00*   (2006.01)

(52) U.S. Cl.
CPC .............. *B60Q 9/002* (2013.01); *B60T 17/22* (2013.01)

(58) Field of Classification Search
CPC ................................ B60Q 9/002; B60T 17/22
See application file for complete search history.

(56) References Cited

U.S. PATENT DOCUMENTS

| | | | |
|---|---|---|---|
| 6,702,405 B1* | 3/2004 | Balz | B60T 13/746 303/192 |
| 8,386,144 B2 | 2/2013 | Jackson et al. | |
| 9,266,513 B2 | 2/2016 | Gates et al. | |
| 2004/0026988 A1* | 2/2004 | Ewinger | B60T 7/12 303/20 |
| 2007/0103279 A1* | 5/2007 | Hayashi | B60R 25/1004 340/426.25 |
| 2008/0177994 A1* | 7/2008 | Mayer | G06F 16/00 709/224 |
| 2011/0184615 A1* | 7/2011 | Marcus | B60L 50/16 903/902 |
| 2011/0224864 A1* | 9/2011 | Gellatly | G07C 5/006 701/29.5 |
| 2015/0232027 A1* | 8/2015 | Freitas | B60Q 9/008 340/435 |
| 2015/0266459 A1* | 9/2015 | Gates | B60T 7/122 180/282 |

(Continued)

FOREIGN PATENT DOCUMENTS

| | | |
|---|---|---|
| CN | 108860119 A | 11/2018 |
| EP | 2570312 A1 | 3/2013 |

(Continued)

*Primary Examiner* — Nay Tun

(57) ABSTRACT

A system for warning that a slope is too steep for securely parking a machine includes: at least one inclinometer configured to be disposed on the machine, the machine being disposed on the slope and to measure a pitch of the machine; a controller that includes a processor and is configured to be operatively connected to the at least one inclinometer and to determine, using the pitch, if the machine cannot park securely; and a warning generator configured to be operatively connected to the controller and to alert at least an operator of the machine that the machine cannot park securely when the controller so determines.

21 Claims, 4 Drawing Sheets

(56) References Cited

U.S. PATENT DOCUMENTS

| | | | |
|---|---|---|---|
| 2015/0344007 A1* | 12/2015 | Lee | B60T 13/662 |
| | | | 701/70 |
| 2018/0118197 A1* | 5/2018 | Kim | B60W 30/06 |
| 2018/0215355 A1* | 8/2018 | Kinder | B60T 7/12 |
| 2019/0071090 A1* | 3/2019 | Coullard | B60T 7/122 |
| 2019/0077390 A1* | 3/2019 | Vora | F16D 66/021 |
| 2019/0100191 A1* | 4/2019 | Kikkawa | G07C 5/0808 |
| 2020/0114892 A1* | 4/2020 | Boyce | F16D 65/16 |
| 2020/0207582 A1* | 7/2020 | Koskinen | B66B 5/18 |
| 2020/0247382 A1* | 8/2020 | Chang | B60Q 9/002 |
| 2021/0001854 A1* | 1/2021 | Niewiadomski | B60W 10/18 |
| 2022/0351622 A1* | 11/2022 | Bush | G06Q 20/127 |
| 2023/0119295 A1* | 4/2023 | Nilsson | G08G 1/143 |
| | | | 701/26 |

FOREIGN PATENT DOCUMENTS

| | | |
|---|---|---|
| JP | 4415706 B2 | 2/2010 |
| JP | 2017-41175 A | 2/2017 |
| KR | 1998-028367 U | 8/1998 |

\* cited by examiner

TOO STEEP TO PARK WARNING SYSTEM AND METHOD FOR A MACHINE

TECHNICAL FIELD

This disclosure relates generally to determining if a machine is located on an incline that exceeds a threshold for safely parking the machine using a parking brake, and if the threshold is exceeded, generating a warning to at least the machine operator.

BACKGROUND

When a machine is parked, and particularly when no operator of the machine is present, it is important that the machine be parked securely, without risk of moving unexpectedly. Should a vehicle be unable to maintain its parked position, there is potential for damage to the vehicle, other property, personal injury, and even loss of life. Therefore, when an operator parks a machine, he or she must be confident that the machine will not move.

Gravity may provide the necessary force to move a parked machine unexpectedly or to cause a park brake to fail to hold when the machine is parked on a great enough slope. To assist the operator in determining if a machine may be safely parked on a slope, it may be useful to provide additional guidance to the operator via some means of warning or alert.

Chinese Pat. No. CN108860119B discloses an electrical parking brake used for a motor vehicle and a parking braking control method of the electrical parking brake. The electrical parking brake includes a lock-up mechanism and a decelerating mechanism. A slope sensor detects the slope on which the motor vehicle is situated and a force is applied based on the sensor result. If the slope on which the vehicle is parked is greater than a preset slope value, then a brake alarm red light will light up to indicate that the vehicle cannot be parked.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and applications of the innovations described herein are defined by the appended claims.

BRIEF SUMMARY

One or more embodiments of the present disclosure provides a system for warning that a slope is too steep for securely parking a machine. The system includes: at least one inclinometer configured to be disposed on the machine, the machine being disposed on the slope and to measure a pitch of the machine; a controller comprising a processor and configured to be operatively connected to the at least one inclinometer and to determine, using the pitch, if the machine cannot park securely; and a warning generator configured to be operatively connected to the controller, and to alert at least an operator of the machine that the machine cannot park securely when the controller so determines.

One or more embodiments of the present disclosure provides a method for warning that a slope is too steep for securely parking a machine. The method includes: measuring, using at least one inclinometer disposed on the machine, a pitch of a machine; receiving, from the at least one inclinometer, the pitch of the machine; determining, using a controller operatively connected to the at least one inclinometer, whether the pitch exceeds a threshold pitch; and warning, using a warning generator operatively connected to the controller, an operator of the machine that the machine cannot park securely when the controller so determines.

One or more embodiments of the present disclosure provides a machine that includes: an engine configured to provide propulsion to the machine; at least one inclinometer disposed on the machine and configured to measure at least one pitch of the machine; a controller operatively connected to the at least one inclinometer and configured to receive the at least one pitch from the at least one inclinometer and to determine, using the at least one pitch, when the machine cannot park securely; and a warning generator operatively coupled to the controller and configured to alert at least an operator of the machine that the machine cannot park securely when the controller so determines.

DETAILED DESCRIPTION

The present disclosure is directed to systems, methods, and devices related to machines. Examples of machines include dozers, motor graders, wheel loaders, excavators, backhoes, loaders, haul trucks, and various other machines. These machines, for example, may be used to move material at a work site. Examples of work sites include a mining site, a landfill, a quarry, a construction site, a roadwork site, a forest, a farm, or any other area in which movement of material is desired. The machines may operate in an autonomous, semi-autonomous, or manual manner to perform tasks in response to commands generated as part of a work plan for the machines. Operations carried out by the machines may include digging, loosening, moving, etc., different materials at the work site such as those related to mining, earthmoving, and other industrial activities.

Figure 1:
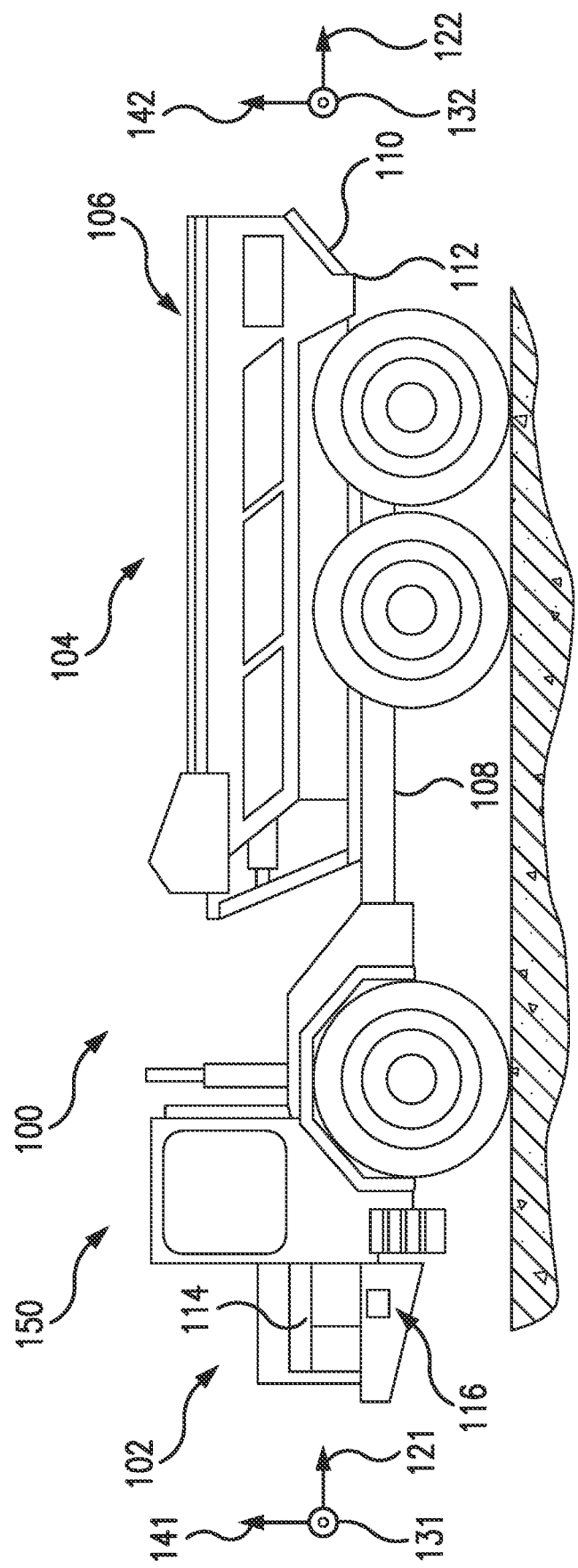
FIG. 1 depicts a side view of an articulated machine in accordance with one or more embodiments.

Referring to FIG. 1, an articulated machine 100 is depicted with a tractor 102 (a first section of the articulated machine 100) and a trailer 104 (a second section of the articulated machine) in combination to transport material in bed 106. In this depiction, trailer 104 also includes a frame 108 on which the bed 106 is mounted. The machine may include a tailgate 110 hinged at the rear edge 112 of bed 106. The tractor 102 may include an internal combustion engine 114, though other means of driving force may be provided, for example, by one or more electric motors connected to one or more batteries, fuel cells, or other means of supplying the machine with power.

In some embodiments, the machine may not be articulated. In other cases it may be articulated at more than one point.

Referring again to FIG. 1, three mutually perpendicular axes may be defined relative to the tractor 102 of the machine 100: a longitudinal axis 121 that points generally in the direction of motion of the machine (shown here pointing to the right), a transverse axis 131 that is generally parallel to the axles of the vehicle (shown here pointing out of the page), and a normal axis 141 that is generally perpendicular to the surface on which the machine 100 sits (shown here pointing up). When the machine 100 is an articulated machine (as shown), this coordinate system is used in reference to the tractor 102. The trailer 104 has a similar, though independent, coordinate system that includes mutually orthogonal second longitudinal axis 122, second transverse axis 132, and second normal axis 142 defined in a similar fashion but relative to the trailer 104.

Rotation about a transverse axis 131, 132 of the machine 100 may be referred to as pitch, while rotation about a longitudinal axis 121, 122 may be referred to as roll. These two rotations, pitch and roll, will be measurements that reflect inclination of the machine 100 and are measured with respect to a horizontal plane. Rotation about a normal axis 141, 142 may be referred to as yaw and may be measured with respect to an arbitrary ray whose origin is at the normal axis 141, 142. For example, yaw may be measured with respect to a positive longitudinal axis 121, 122. For land-bound machines, yaw may be largely ignored because the medium against which propulsion occurs is stationary, unlike watercraft and aircraft, which are propelled by force against a fluid medium (i.e., water and air, respectively).

The machine 100 may include an engine control module (ECM) 116, also commonly called an engine control unit (ECU). The ECM may be located anywhere in or on the machine 100. As an example, the ECM may be located in the tractor 102. The ECM may function as a computer that controls and regulates different performance parameters of the machine's internal combustion engine. The ECM may control a series of actuators on the engine to keep the engine performing optimally. The ECM may do this by reading the values from a plurality of sensors within the engine bay including one or more motor speed sensors, interpreting the data, and adjusting the engine actuators. Among other things, the ECM may control air-fuel mixture, ignition timing, and idle speed. ECM failure may decrease the efficiency of the machine's engine, and in more extreme cases, the engine may entirely fail to run.

In some machines, the ECM may use look-up tables to interpret the data from the sensors. The ECM may map data to the closest value in a look-up table, may perform linear or nonlinear interpolation between look-up table values. Interpolation may be done successively one sensor or sensor type at a time or multi-variate interpolation may be performed by the ECM using data from multiple sensors or sensor types simultaneously. In other cases, the ECM may apply one or more algorithms to the sensor data to provide useful output to an operator of the machine.

The machine 100 may include or have disposed in or on it one or more inclinometers. An inclinometer (also known as a clinometer) is used to measure an angle of inclination relative to a horizontal surface, the horizontal surface being defined as a surface perpendicular to the direction of the force of gravity. A plurality of inclinometers may provide redundancy in the case of failure of an inclinometer or the transmission of inclinometer measurements for processing. A plurality of inclinometers may also allow for averaging of data and for identifying outlying values and potential errors by the ECM or one or more other processors. Further, in an articulated machine 100, each section of the articulated machined 100, for example, the tractor 102 and the trailer 104, may be provided with one or more inclinometers to provide inclination measurements for each section.

The machine 100 may also include a cab 150 for an operator. The cab 150 may include controls for the machine 100 as well as displays, indicators, and alerts to provide necessary information to the operator.

Figure 2:
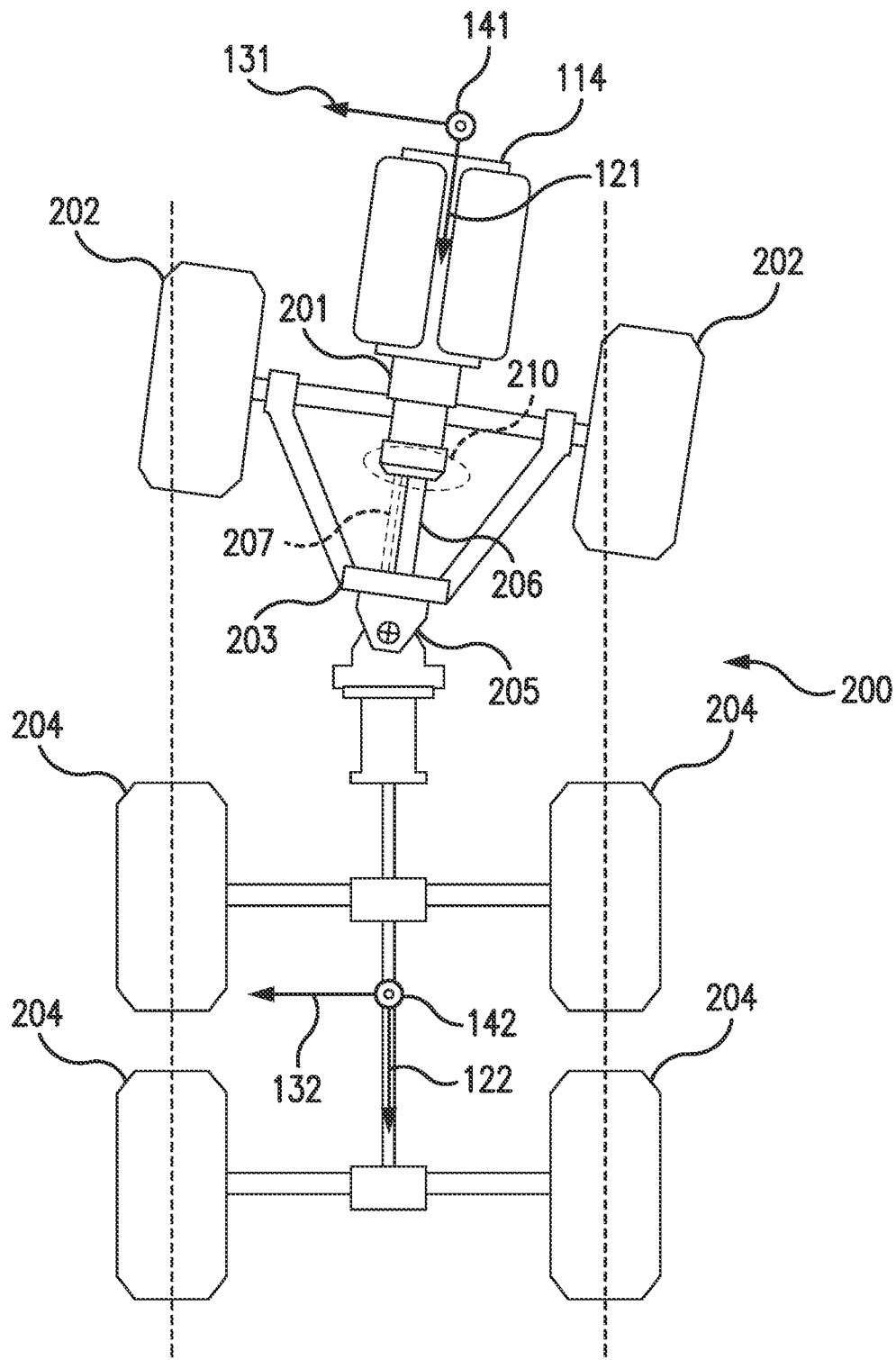
FIG. 2 depicts an overhead view of a drive system of an articulated machine in accordance with one or more embodiments.

Referring now to FIG. 2, an overhead view of a power system 200 of an articulated machine 100 is depicted. Engine 114 drives the front wheels 202 and the rear wheels 204. The hitch 205 serves as the articulation joint (or articulation point) between the tractor (shown to the left of the hitch 205) and the trailer (shown to the right of the hitch 205).

The machine 100 may also include sensors for determining the load on each axle or each wheel 202, 204. These load sensors may measure pressure, strain, force, and the like. Other sensors may measure brake pack wear life and usage, which may be stored as time since installation of the brakes, number of times the brakes have been applied, cumulative duration of the use of the brakes, deceleration during braking, change in speed during braking, and the like. One or more of these data may be used to calculate the brakes' ability to hold the machine motionless against a force seeking to move the machine. For example, on an incline, a component of the force of gravity parallel to surface on which the machine is positioned will supply a force seeking to move the machine. More specifically, the force of gravity parallel to the longitudinal axis of the pitch of one or more sections of the machine may affect the ability of a machine to park safely and securely.

The machine 100 may have multiple sets of brakes. For example, the tractor 102 and the trailer 104 may each have one or more sets of brakes. Brake sensors may be supplied to each of the brakes and/or sets of brakes.

A steering sensor located at the hitch 205 may be used to measure the articulation angle of the articulated machine 100. When articulated, machine 100 may have different loads on the brakes and may have different braking capability. Measurements from the steering sensor and front and back brake sensors may serve as inputs to the determination of whether the machine 100 is in a position that is not safe for parking.

In one or more embodiments of the present disclosure, a system for warning that a slope is too steep for safe and secure parking may include one or more sensors, a controller, data storage, and a warning generator.

Figure 3:
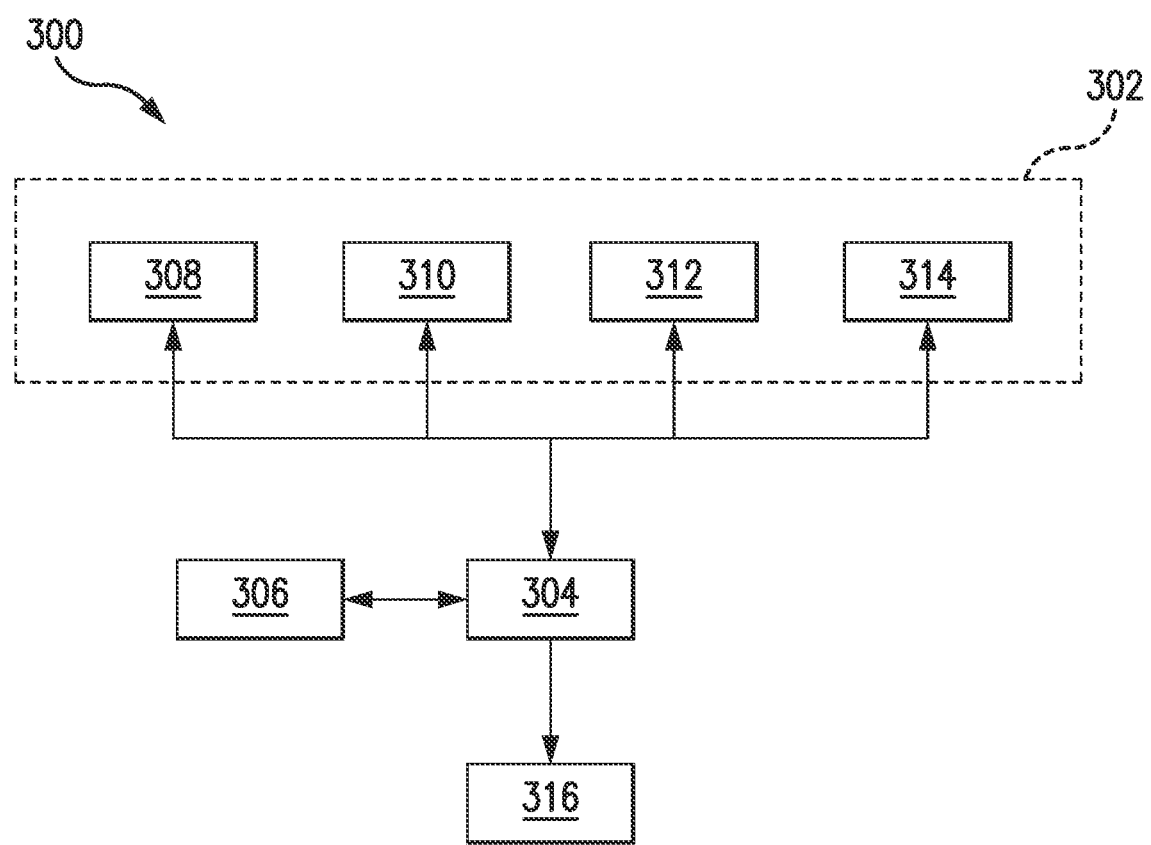
FIG. 3 depicts schematically a system for detecting and warning when a pitch of the machine is too great for safe and secure parking.

Referring to FIG. 3, a warning system 300 may include one or more sensors 302. The sensors may be operatively connected by wired or wireless technology to a controller 304 and data storage 306. The sensors include an inclinometer 308 for measuring the pitch of a machine. In the case of an articulated machine, inclinometer 308 may be located in one section of the machine, for example, the tractor or the trailer. Machines may have one or more additional inclinometers 310 to provide a plurality of pitch measurements for averaging, for redundancy in case of measurement error or sensor or communication failure, and/or for placement on additional sections of a multiply-articulated machine. Inclinometers 308, 310 may be unidirectional (for example, measuring only pitch) or multidirectional. Inclinometers may be accelerometers, liquid capacitive, electrolytic, gas bubble in liquid, pendulum, and the like.

Other sensors 302 may include one or more brake pack wear sensors 312 and one or more machine load sensors 314. Machine load sensors may provide load measurements for one or more axles and/or one or more wheels of the machine.

The controller 304 may be located on the machine, for example an engine control module, or it may be off the machine but at the work site or at a more remote location. Communication between components of the system 300 may be wireless or wired. Communication modes such as Internet, Bluetooth, and other means may be used by the system.

The controller 304 may include one or more processors that communicate with the sensors 302, including receiving data from the sensors, performing operations on the received data, storing the received data, processed data, and other output in data storage 306. The controller 304 may determine if the slope of an incline on which the machine is located is too steep to safely park. The controller may determine if the pitch of at least one inclinometer 308, 310 exceeds a predetermined threshold for safe parking, in which case a warning generator 316 generates at least a warning to an operator of the machine. The pitch may be a positive or negative value (or zero). The absolute value of the pitch may be used in the determination. There may be different predetermined thresholds for positive and negative pitches. Different predetermined thresholds may be used for each section of an articulated machine (for example, a tractor and a trailer). A plurality of thresholds may be stored in the controller and/or the data storage. Thresholds may be updated based on machine history. A warning may be generated if at least a single predetermined threshold is exceeded.

In other cases, another determination, perhaps involving more complicated analysis, may be used. For instance, the controller may detect motion based on one or more accelerometers, gyroscopes, motor speed sensors, or the like after the parking brake has been applied. In such a case, the controller may update one or more pitch thresholds to the current pitch to warn against parking on a slope that exceeds the new pitch threshold(s). As an example, if a current pitch threshold is set at 20 degrees (20°), but a controller detects motion of the machine, perhaps with data from a motor speed sensor, when the machine has the parking brake applied on a slope of 15 degrees, the controller may update the pitch threshold to 15 degrees.

In one or more embodiments, measurements from brake pack wear sensors 312, machine load sensors 314, and other data relevant to brake wear may be included in determining a safe slope. These additional measurements and data may be used to adjust the threshold by using one or more look-up tables. A look-up table may use a single variable input or may use multi-variable input. Interpolation may be used between values in a look-up table. The interpolation may be linear or nonlinear.

When an unsafe parking condition is determined, warning generator 316 generates a warning to at least an operator of the machine. A warning may also be generated for other relevant parties including work site supervisors and managers, off-site supervisors and managers, machine, brake, and other related equipment manufacturers, machine owner and/or lessor, machine lessee, and the like. Warnings may be communicated by wired and/or wireless means.

In one or more embodiments, the system 300 may include wireless communication between the machine and one or more off-board locations. An off-board location may be at the work site or anywhere in the world. Off-board locations may provide data storage for sensor data acquired on the machine. The sensor data may be from a plurality of machines. An off-board location may include one or more processors that may or may not be disposed in or on a controller. The off-board processors may be used to determine if a machine may park safely and securely based on sensor data received from the machine. The off-board location may then cause a warning to be delivered to the operator of the machine as well as to others such as on-site or off-site supervisors, managers, the manufacturer of the machine, the owner of the machine, the entity using the machine, a servicer of the machine, and the like.

A warning may be delivered to an operator and/or to other relevant parties in a number of different ways. A warning generator that is operatively connected to the controller or to an off-board location that determines when a warning is necessary to indicate that a slope is too steep for safe parking may alert an operator and other relevant parties through a visual alert, an audible alert, a tactile alert, or a combination of alerts.

Visual alerts include a steady, flashing, or strobing light and the like. The light may be colored and may be located on a control panel of the operator. Strobing light may be located in the operator's cabin. Visual alerts may include a written message. Visual alerts may be presented on an operator's display, including on a head-up display that would appear in the operator's line of sight or field of view while operating the equipment.

Audible alerts include a siren, a horn, a klaxon, a buzzer, a bell, a tone, a series of tones, and a spoken warning. For example, a spoken warning may be "Danger! The slope is too steep for safe parking."

Tactile alerts may include a vibrating joystick, a vibrating seat, and/or a vibrating pedal. Vibrations may be steady or may follow some sort of pulsing pattern.

An alert or warning may also prevent the machine from being shut down and/or prevent the removal of a key.

Alerts may be issued any time that a machine is on a slope where the pitch exceeds a threshold, or the alert may only be issued when an operator is attempting to park and the pitch exceeds the threshold.

The threshold may be a single, fixed value, perhaps one preset and predefined by the manufacturer of the machine or of the brakes. In other cases, the threshold may vary based on other conditions. These conditions may include brake pack wear, load carried by the machine at the time of attempted parking, and the like. Brake pack wear may be determined by a number of factors including time since last brake replacement, number of times the brakes were applied, duration of application of the brakes, deceleration curve during braking, change in speed during braking, and the like.

Figure 4:
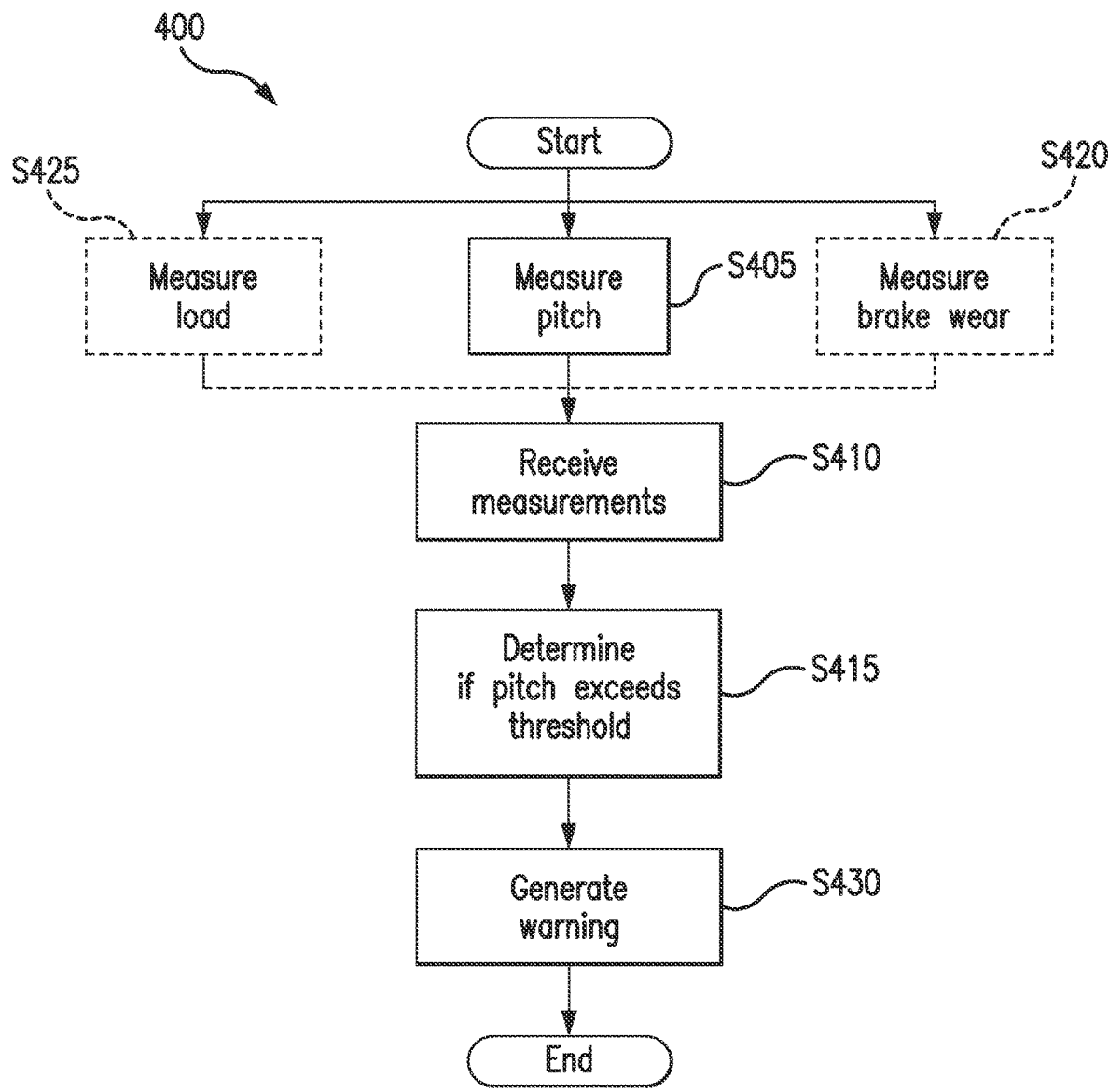
FIG. 4 presents a flowchart of a method for providing a warning when a slope is too steep to park on safely and securely in accordance with one or more embodiments.

Referring to FIG. 4, a method 400 of warning one or more parties when a machine is on a slope that is too steep to park safely and securely is described. The method includes measuring at least one pitch of a machine using at least one inclinometer disposed on the machine at operation 5405. Sensor measurements, including inclinometer measurements, are received by a controller at operation 5410. The measurements may be used by the controller to determine whether a pitch measured by the at least one inclinometer exceeds a threshold at operation 5415. The threshold may be predetermined or may vary based on a plurality of inputs including measurements from other sensors. Optionally, other sensor measurements that may be included are machine brake wear, including brake pack wear, as measured at operation 5420 and machine load measurements taken at operation 5425. If the controller determines that a pitch exceeds a threshold at operation 5415, a warning is generated for at least an operator of the machine and, if desired, other relevant parties at operation 5430. Warnings that are generated may be audible, visual, tactile, or a combination of these. Warnings may be transmitted by wire or wirelessly.

INDUSTRIAL APPLICABILITY

The industrial applicability of the systems, devices, and methods described herein will be readily appreciated from the foregoing discussion. The foregoing discussion is applicable to systems, devices and methods for at least industrial work sites and machines used there, particularly when slopes of varying degree are present. The ability to park a machine safely and securely, and to alert at least an operator when parking on a particular slope is unsafe is very important for the protection of the machine, the operator, structures at the work site, and other persons present at the work site.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by this disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for warning that a slope is too steep for securely parking a machine, the system comprising:
    at least one inclinometer configured to:
        be disposed on the machine, the machine being disposed on the slope; and
        measure a pitch of the machine;
    at least one brake pack wear sensor configured to measure brake wear operatively associated with the machine and configured to determine an ability of the brake pack to hold the machine motionless on the slope;
    a controller comprising a processor and configured to:
        be operatively connected to the at least one inclinometer and the at least one brake pack wear sensor; and
        determine, by combining and using the pitch and the measured brake wear, if the machine cannot park securely because of a risk of gravity-induced movement of the machine despite application of a parking brake; and
    a warning generator configured to:
        be operatively connected to the controller; and
        alert at least an operator of the machine that the machine cannot park securely when the controller so determines.

2. The system of claim 1, wherein the alert comprises at least one of an audible alert, a visual alert, and/or a tactile alert.

3. The system of claim 2, wherein the audible alert comprises at least one of a siren, a horn, a klaxon, a buzzer, a bell, a tone, a series of tones, and/or a spoken warning.

4. The system of claim 2, wherein the visual alert comprises at least one of a steady light, a flashing light, a strobing light, and/or a written message.

5. The system of claim 2, wherein the tactile alert comprises at least one of a vibrating joystick, a vibrating seat, and/or a vibrating pedal.

6. The system of claim 1, wherein determining if the machine cannot park securely comprises determining if the pitch exceeds a predetermined threshold pitch.

7. The system of claim 1, wherein determining if the machine cannot park securely comprises using at least one look-up table.

8. The system of claim 1, wherein the controller is further configured to:

be operatively connected to at least one load sensor of the machine; and determine, using the pitch, the brake wear data, and load data from the at least one load sensor, if the machine cannot park securely.

9. The system of claim 1, wherein the controller comprises an engine control module.

10. The system of claim 1, wherein the controller is configured to update a pitch threshold to the pitch when the controller detects motion of the machine after a parking brake has been applied and the pitch is less than the pitch threshold.

11. The system of claim 1, wherein:
the machine is articulated and comprises at least a first section and a second section with at least one articulation point between the first section and the second section,
the at least one inclinometer comprises at least a first inclinometer and a second inclinometer configured to be disposed on at least the first section and the second section, respectively, of the machine and to measure a first pitch of the first section and a second pitch of the second section, respectively, and
the controller is further configured to:
be operatively connected to at least the first inclinometer and the second inclinometer, and
determine, using at least the first pitch and the second pitch, if the machine cannot park securely.

12. The system of claim 11, wherein the controller determines that the machine cannot park securely when either the first pitch exceeds a first predetermined threshold or the second pitch exceeds a second predetermined threshold.

13. The system of claim 11, wherein the controller is further configured to receive a brake pack wear data, and to determine when the machine cannot park securely using at least the first pitch, the second pitch, and the brake pack wear data.

14. The system of claim 13, wherein the controller determines that the machine cannot park securely using at least one look-up table.

15. The system of claim 13, the system further comprising at least one brake pack wear sensor,
wherein at least part of the received brake pack wear data is received from the at least one brake pack wear sensor.

16. The system of claim 13, the system further comprising at least one load sensor configured to measure an axle load or a wheel load of the machine and provide a load data,
wherein the controller is further configured to:
be operatively connected to the at least one load sensor, and
determine, using at least the first pitch, the second pitch, the brake pack wear data, and the load data from the at least one load sensor, when the machine cannot park securely.

17. A method for warning that a slope is too steep for securely parking a machine comprising:
measuring, using at least one inclinometer disposed on the machine, a pitch of a machine;
receiving, from the at least one inclinometer, the pitch of the machine;
determining, using a controller operatively connected to the at least one inclinometer, whether the pitch exceeds a threshold pitch;
warning, using a warning generator operatively connected to the controller, an operator of the machine that the machine cannot park securely when the controller so determines;
measuring, using at least one brake pack wear sensor operatively connected to the controller, a brake pack wear; and
determining, using the controller, when the pitch exceeds a second threshold pitch based on both the pitch and the brake pack wear data.

18. The method of claim 17, further comprising:
measuring, using at least one load sensor operatively connected to the controller, a machine load and providing a machine load data; and
determining, using the controller, when the pitch exceeds a third threshold pitch based on the pitch, the brake pack wear data, and the machine load data.

19. The method of claim 17, further comprising:
updating, with the controller, the pitch threshold to the pitch when the controller detects motion of the machine after a parking brake has been applied and the pitch of the machine is less than the pitch threshold.

20. A machine comprising:
an engine configured to provide propulsion to the machine;
at least one inclinometer disposed on the machine and configured to measure at least one pitch of the machine;
at least one brake pack wear sensor configured to measure brake wear operatively associated with the machine and configured to determine an ability of the brake pack to hold the machine motionless on the slope;
at least one load sensor configured to provide load measurements applied to the machine,
a controller operatively connected to the at least one inclinometer, the at least one brake pack wear sensor, and the at least one load sensor, and configured to:
receive the at least one pitch from the at least one inclinometer;
receive the measured brake wear from the at least one brake pack sensor about the brake pack;
receive the load measurements from the at least one load sensor; and
determine, using the at least one pitch in comparison to a pitch threshold as adjusted with the measured brake wear and the load measurements, when the machine cannot park securely; and
a warning generator operatively coupled to the controller and configured to alert at least an operator of the machine that the machine cannot park securely when the controller so determines.

21. The machine of claim 20, wherein the controller is further configured to updating the pitch threshold to the pitch when the controller detects motion of the machine after a parking brake has been applied and the pitch of the machine is less than the pitch threshold.

* * * * *